Sept. 2, 1930. L. OTTINGER Re. 17,788

BUSHING
Original Filed March 3, 1924

INVENTOR
Leon Ottinger
BY C. R. Zepel
his ATTORNEY

Reissued Sept. 2, 1930

Re. 17,788

UNITED STATES PATENT OFFICE

LEON OTTINGER, OF NEW YORK, N. Y.

BUSHING

Original application filed March 3, 1924, Serial No. 696,426. Patent No. 1,641,988, dated September 13, 1927. Divided and this application filed March 11, 1927, Serial No. 174,494. Original No. 1,745,951, dated February 4, 1930. Application for reissue filed April 17, 1930. Serial No. 446,467.

This application is based on one of the features disclosed in my copending reissue application Serial No. 352,873, filed April 5, 1929, namely that of having the resilient bearing bodily shiftable laterally so as to afford a greater degree of accommodation for a shaft or other element passing therethrough.

As in the copending reissue application, the present embodiment of bushing is described in combination with a door and latch, not as a delimitation of the scope of invention or usefulness of the device, but because it affords an excellent opportunity to demonstrate the desirable and inventive features thereof.

It will therefore be understood that I conceive it that invention not only resides in the combination but in the bushing per se. With this understanding I shall proceed to describe the bushing both as to its individual characteristics and in respect of the combination aforementioned.

Figure 1:
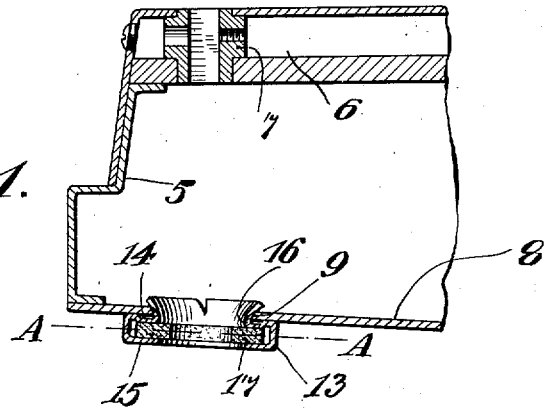
Figure 2:
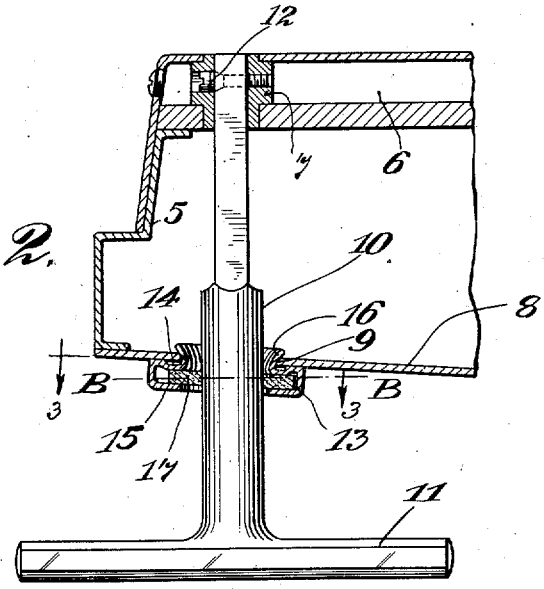
Figure 4:
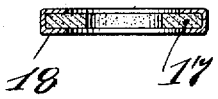
Figure 3:
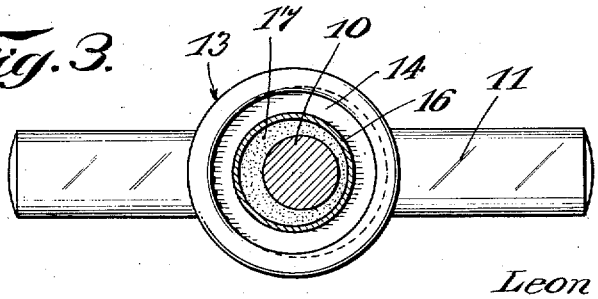

In the accompanying sheet of drawing,

Fig. 1 is a horizontal section through part of an automobile door and latch showing my bushing in operative position; Fig. 2 is similar to Fig. 1 with the latch shaft passing through the bushing and connected to the rollback of the latch; Fig. 3 is an enlarged view taken on the line 3—3 of Fig. 2; and Fig. 4 is a modified form of bearing.

In the manufacture of automobiles, the latch for the door is secured to the inner side thereof before the handle receiving opening is drilled and the operating handle inserted and connected with the latch rollback. In recent years, many of the automobile manufacturers have adopted the all metal type of body, including the doors which are provided with inner and outer stamped sheet metal plates secured upon a suitable marginal frame structure. Since the latch rollback is located at the inner side of the door and said door is of appreciable thickness, it not infrequently occurs, that through carelessness on the part of the workman, when the opening is drilled through the outer door plate, it is found that the center of said opening is considerably out of alignment with the center of the bore or opening of the latch rollback. Since the position of the latter opening in which the inner end of the handle shaft is to be fitted and rigidly secured determines the angle at which the shaft will project through said opening in the outer door plate, it will be apparent that said latter opening and the shaft will be in eccentric relation to each other. Therefore, if the supporting means or bushing for the shaft which is secured to the outer door plate around said opening has its shaft engaging surface or bearing positioned in a plane which is parallel with the plane of the door plate and concentric with said opening, it will be apparent that if it is possible to insert the shaft through the bearing member and connect the same with the rollback, the said shaft would have such severe binding or frictional engagement with the supporting or bearing member as would prevent its free operative rotation. Since the degree of eccentricity which the opening in the outer door plate may bear with relation to the opening of the rollback is variable, it would not be possible to provide a non-yielding bearing or support of special construction for the shaft which would be applicable in all cases. The present invention obviates this difficulty and provides a device which will permit of the operative connection of the shaft with the rollback and its free rotation even in those cases where there is a relatively great misalignment between the opening in the outer door plate and the opening of the rollback and in which cases even a yieldable or flexible bearing element would not alone subserve the intended purpose without resulting in such frictional resistance as would prevent the easy and free rotation of the operating shaft.

For purposes of illustration, in the drawing I have shown a part of an automobile door having inner and outer side plates of sheet metal which are adapted to be suitably secured to a frame generally indicated at 5. To this frame and the inner side plate of the door the latch 6 of any approved type is secured the latch mechanism including the customary actuating rollback 7.

The outer side plate 8 of the door structure which is usually positioned at a slight inclination with respect to the inner door plate so that the door slightly tapers or decreases in thickness towards its free edge is adapted to be provided with an opening therethrough for the purpose of assembling the latch handle shaft. This opening indicated at 9 should be in exact alignment with the bore or opening of the rollback 7. As indicated in the drawing, however, it not infrequently occurs that due to carelessness on the part of the workmen, the center of this opening through the outer door plate is greatly out of alignment with the center of the opening through the rollback. Therefore, when the shaft 10 of the latch handle 11 is fitted at its inner end within the bore of the rollback and rigidly fixed by the screw 12 or other convenient fastening means, the said shaft will bear an eccentric relation to the opening 9. Since this shaft is of an appreciable length and it has a fixed connection at its inner end to the rollback, it is of course necessary to provide a bearing or support for said shaft at the outer side of the door. Unless this bearing is of special form so that it may be secured to the door plate 8 which is positioned in a plane at other than a right angle to the handle shaft, adequate support for the shaft which would at the same time permit of its free rotation would not be obtained. Therefore, I prefer the escutcheon member or bushing 13 as in my copending application, which is formed preferably from a sheet metal stamping and is provided with a hollow annual head having inner and outer spaced parallel walls 14 and 15 respectively, said inner wall being provided at its inner edge with a projecting sleeve indicated at 16 which is adapted to be inserted through the opening 9 and interlocked with the door plate 8 at the edge of said opening to rigidly and permanently secure the escutcheon member or bushing in fixed relation to the door plate.

The bearing 17 for the handle shaft is in the form of a ring or annulus of yieldable or compressible material. Preferably, I use a high grade of felt having very closely knit fibers impregnated with an animal oil for the purpose of rendering the same substantially water-proof. This annular bearing element as clearly shown in Fig. 1 of the drawing, has an outer diameter which is appreciably less than the internal diameter of the annular head 13 of the escutcheon member or bushing and an internal diameter which is appreciably less than the internal diameter of the sleeve 16. The bearing element 17 is of such thickness that in its normal condition the outer part thereof has snug frictional contact with the opposed surfaces of the inner and outer walls 14 and 15 of the escutcheon member. Said bearing element may, however, be bodily shifted under pressure in its own plane or laterally between said walls of the escutcheon member.

Assuming that the opening 9 has been drilled through the outer door plate in substantially the eccentric relation with respect to the bore or opening of the rollback 7 as shown in the drawing and that the bearing element 17 is in a normal position substantially in concentric relation to the escutcheon member which has been applied and secured to the door plate 8, it will be observed from reference to Fig. 1 that the bearing element 17 is positioned in a vertical plane substantially parallel with the face of the door plate 8 and at right angles to the axis of the opening 9 as indicated in Fig. 1 by the broken line A—A. Therefore, when the handle shaft 10 is inserted, as the extremity thereof enters the bore of the rollback 7 and the enlarged cylindrical part of the shaft as shown in Fig. 2 enters the opening of the bearing element 17, the lateral pressure of the handle shaft against the wall of said opening causes the bearing element to be shifted bodily in its own plane between the spaced walls 14 and 15 of the bushing to an eccentric position with relation to said bushing. At the same time, owing to the frictional engagement of the periphery of the shaft with the bearing element, said element if it were not held between the walls 14 and 15 would assume a position in a plane at right angles to the axis of the shaft as indicated in Fig. 2 by the broken line B—B. This results in the tendency of the shaft to twist or distort the flexible bearing element and causes the side faces of said bearing element at the outer part thereof to exert a very tight binding pressure against the inner and outer walls 14 and 15 of the escutcheon member. The inner part of said bearing element however, being free from contact with the walls of the escutcheon member or bushing, may have a sufficient relative yielding motion with respect to said member as will effectively cushion or absorb any vibratory motions of the handle shaft which may be transmitted thereto through the door structure and prevent metallic contact between said shaft and the sleeve 16 or the edge of the opening in the outer wall 15 of the bushing. Therefore, it will be seen that I obtain all the advantageous results of the construction claimed in my copending application above identified and wherein the bearing element is fixedly held against bodily movement relative to the escutcheon member, and at the same time I make it possible to utilize such a bearing element in those cases where due to the relatively great mis-alignment between the centers of the opening 9 in the door plate and the opening through the rollback sufficient flexibility with the requisite resistance to wear could not be secured in the fixed type of bearing, without impressing upon the shaft such severe frictional resistance to its operative rotation as would render the same commercially undesirable. It will also be noted that in the event of wear at the bearings of the rollback 7 in the walls of the latch case, the yieldable bearing element 17 acting upon the shaft at the outer side of the door will yieldably resist any tendency of the inner end of the shaft and rollback to vibrate and will support the shaft normally in a definite angular position with respect to the door structure. It will further be observed that the bearing element 17 is comparatively thin so that notwithstanding the fact that this element is composed of a hard tightly knit felt, the inner unsecured part thereof will possess sufficient flexibility for the intended purpose.

In Fig. 4 I have shown an alternative form of the shaft bearing or supporting member, in which the outer part of the annular body of felt or other yieldable material which is frictionally confined between the inner and outer walls of the escutcheon head is encased in a thin sheet of metal as indicated at 18. This permits of greater freedom in the sliding or shifting coaction between the bearing and the escutcheon member and also makes it possible to employ a somewhat cheaper grade of felt. It will however, be noted that in this case the inner part of the felt bearing element projects beyond the inner edges of the side flanges of the metal 18 and remains free for relative flexing or cushioning movement to yieldingly resist vibratory motion of the shaft and sustain the same out of contact with the escutcheon member.

From the foregoing description considered in connection with the accompanying drawing, it is believed that the construction, manner of application and use and the several advantages of my present invention will be fully understood. By the provision of such a flexible bearing element with means for supporting the same in attached relation to the outer face of the door for bodily shifting movement as the shaft is inserted and connected with the latch rollback, I am enabled to provide a proper and adequate support for the shaft although the opening in the door plate may be inaccurately located, and without necessitating the use of an especially formed shaft bearing member or alteration of such members as may be carried in stock. At the same time, my new bearing insures an absence of the metallic rattling noise incident to contact between the handle shaft and the metallic supporting or bearing member as well as an appreciable economy in this item of automobile manufacture and greater facility in the assemblage of the several parts. Also, the special grade of oil impregnated felt which I employ for the bearing element 17 is of great durability, being substantially immune to deterioration by the elements, temperature changes or analogous causes and provides a substantially fluid and dust tight closure of the opening through the supporting or escutcheon member around the handle shaft.

I have herein illustrated a practical embodiment of the invention which I have found to be very desirable in actual use. Nevertheless, it is possible that the essential features of my present disclosure might also be exemplified in various other alternative constructions, and I accordingly reserve the privilege of resorting to all such legitimate changes therein as may be fairly embodied within the spirit and scope of the invention as claimed.

Having described my invention, what I claim is:

1. A unitary bushing comprising a hollow head portion, a sleeve integral therewith for insertion in and attachment to a bored structure, and a resilient bearing in said head bodily shiftable laterally therein.

2. A unitary bushing comprising a hollow head portion and an attaching portion integral therewith adapted to be distorted in securing said bushing in operative position, said attaching portion comprising the sole securing means for said bushing, and a resilient bearing in said head bodily shiftable laterally therein.

3. A unitary bushing having a portion integral therewith adapted to be distorted in securing said bushing in operative position, and a resilient bearing combined with said bushing adapted to support a member out of contact with said bushing, said bearing being bodily shiftable laterally relatively to said bushing.

4. A bushing comprising a hollow head, a sleeve connected thereto adapted to be distorted at a point away from the juncture of said head and sleeve to provide the sole means for securing said bushing in operative position, and a laterally shiftable resilient bearing in said head arranged to support a member out of contact with said sleeve and head.

5. A bushing comprising a hollow head, a sleeve integral with a part thereof extending therefrom at substantially right angles thereto and adapted to be distorted at a point away from the juncture of said head and sleeve to provide the sole means for securing said bushing in operative position, and a laterally shiftable resilient bearing in said head adapted to support a member out of contact with said sleeve and head.

6. A bushing having a hollow head, a sleeve extending from said head and adapted to be distorted at a point remote from the juncture of said head and sleeve to provide the sole means for securing said bushing in operative position, and a relatively thin, flat, resilient bearing laterally shiftable in said head arranged to support a member out of contact with said head and sleeve.

7. A bushing having a diametrically enlarged hollow head, a sleeve extending from said head and adapted to be distorted at a point away from the juncture of said head and sleeve to provide the sole means for securing said bushing in operative position, and a laterally shiftable resilient bearing in said head adapted to support a member out of contact with said sleeve and head.

8. A bushing having a diametrically enlarged hollow head, a sleeve integral with a portion of said head adapted to be distorted at a point away from the juncture of said head and sleeve to provide the sole means for securing said bushing in operative position, and a resilient bearing having a major portion thereof confined in said head, and the entire bearing being confined solely to said head region and shiftable laterally therein, said bearing being adapted to support a member out of contact with said head and sleeve.

9. A bushing comprising a diametrically enlarged hollow head having an opening, a sleeve integral with a portion of said head and adapted to be distorted at a point remote from the juncture of said head and sleeve to provide the sole means for securing said bushing in operative position, and a resilient bearing confined in and solely to said head and having a portion extending into said opening, said bearing being shiftable laterally and having itself an opening substantially concentric with but of less diameter than the openings in said head and sleeve.

10. A bushing having a diametrically enlarged head, a sleeve extending from said head and adapted to be distorted around the edge remote from said head to provide the sole means for securing said bushing in operative position, and a laterally shiftable resilient bearing of less thickness than the diameter of said head and confined in and solely to said head, said bearing being adapted to support a member out of contact with said sleeve and head.

11. A bushing having a hollow head, a sleeve extending from said head and adapted to be distorted at the edge remote from said head to provide the sole means for securing said bushing in operative position, and a relatively thin, flat resilient bearing confined in and solely to said head and shiftable laterally therein and adapted to support a member out of contact with said sleeve and said head.

12. A bushing having a hollow head, a sleeve extending therefrom and adapted to be distorted at the edge remote from said head to provide the sole means for securing said bushing in operative position, and a laterally shiftable resilient bearing in said head of less thickness than the depth of said bushing, adapted to support a member out of contact with said sleeve and head.

13. A unitary bushing having an opening and an integral portion adapted to be distorted in securing said bushing in operative position, said bushing having a resilient bearing portion provided with an opening the internal diameter of which is less than the internal diameter of the bushing, said bearing being bodily shiftable laterally relatively to said bushing.

LEON OTTINGER.